S. PORTESI & J. TAINI.
NUT LOCK.
APPLICATION FILED APR. 29, 1916.

1,231,064.

Patented June 26, 1917.

Inventors
Santos Portesi
John Taini

By 
Attorney

UNITED STATES PATENT OFFICE.

SANTOS PORTESI AND JOHN TAINI, OF DEL RIO, TEXAS.

NUT-LOCK.

1,231,064. Specification of Letters Patent. Patented June 26, 1917.

Application filed April 29, 1916. Serial No. 94,479.

*To all whom it may concern:*

Be it known that SANTOS PORTESI and JOHN TAINI, citizens of the United States, residing at Del Rio, in the county of Val Verde and State of Texas, have invented certain new and useful Improvements in Nut-Locks; and they do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to nut locks and has for its object to provide a simple, strong, durable and efficient arrangement for effectually locking a nut on a bolt against rotation to loosen or unthread the nut but which allows the nut to be readily tightened or threaded on the bolt so as to take up wear whenever required.

With this object in view the invention consists in the novel construction of the nut locking devices and in the arrangement and combination of the parts, all of which will be first fully described and afterward specifically pointed out in the appended claims.

Referring to the accompanying drawings—

Like numerals of reference indicate the same parts throughout the several figures in which—

Figure 1:
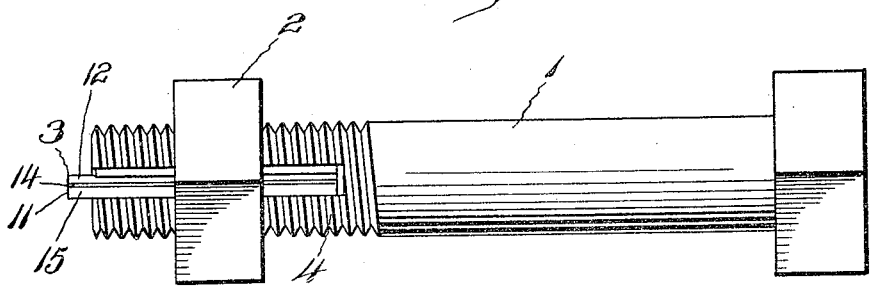
Figure 1 is an elevation of a nut and bolt embodying the locking mechanism combined in accordance with this invention.
Figure 2:
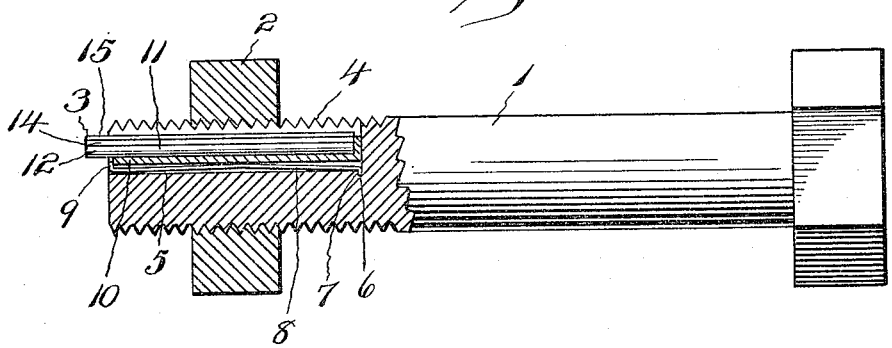
Fig. 2 is a view illustrating the nut and a portion of the bolt and locking mechanism in section.

1 indicates the bolt, 2 the nut and 3 the locking mechanism. The threaded portion 4 of the bolt 1 is provided longitudinally thereof with a flat bottom groove 5 terminating in a small recess 6 at the inner end of the groove to receive the depending end 7 of the leaf spring 8 resting on the flat bottom of the groove 5, the said leaf spring 8 having its forward end 9 upturned in front of the spring mounted bearing member 10 as shown in the several figures.

Figure 3:
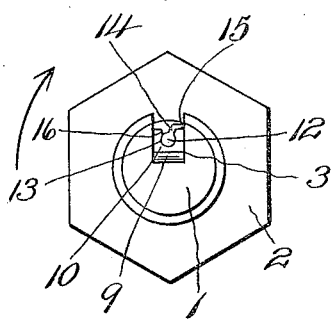
Fig. 3 is an end elevation of the nut, bolt and locking mechanism illustrating the latter, particularly in the position it assumes when rotating the nut in the direction of the arrow to thread the nut on the bolt
Figure 4:
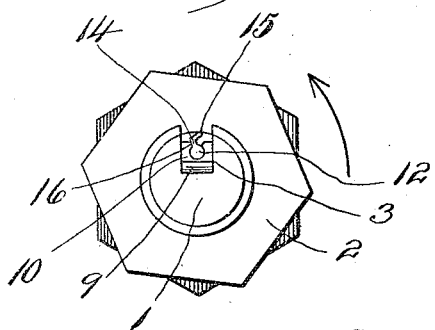
Fig. 4 is a similar view illustrating the position the locking mechanism assumes upon application of a force in the direction of the arrow to loosen or unthread the nut on the bolt.
Figure 4:

11 indicates the nut engaging and locking element which comprises a shaft portion 12 entering the longitudinal bearing 13 in the bearing member 10, the said nut engaging and locking member 10 being provided with an upstanding shank 14 which terminates in a longitudinal knife edge 15 disposed angularly with relation to the shank 14 so that initial rotation of the nut 2 in the direction of the arrow in Fig. 4 will cause the nut engaging member 12 to partially rotate in its bearing 13 and engage the threads of the nut and assume the position shown in Fig. 4 in which the shank 14 of the member 12 impinges against the longitudinal stop 16 formed by the wall of the bearing member 10. Further force applied to the nut 2 in the direction of the arrow in Fig. 4 will cause the knife edge 15 to enter the threads of the nut and effectually prevent rotation of the nut in the direction of the arrow in Fig. 4, the nut engaging member 12 being resiliently held in its bearing member 10 in effective position by the leaf spring 8. Upon rotation of the nut 2 in the direction of the arrow in Fig. 3, the nut engaging and locking member 12 assumes the position as shown in Fig. 3, thus allowing the threads of the nut to pass over the knife edge 15 without being engaged and locked thereby. Thus it is apparent that the nut can at all times be tightened or threaded on the bolt into its most efficient position but cannot loosen or unthread thereon.

The parts being assembled as shown and described the nut can be readily removed from the bolt by withdrawing the nut engaging and locking member 12. For this purpose, the end of said member is caused to project beyond the end of the bolt so as to be readily engaged and removed by a suitable tool or implement. In service however, the leaf spring 8 engages and retains the bearing member 10 in its proper position while the nut engaging and locking member 12 is held in its effective position by means of the tension exerted on the bearing 10 by the leaf spring 8.

Having thus described the several parts of the invention it is apparent that the same is susceptible to certain changes in the construction and arrangement of the parts and we consider ourselves clearly entitled to all such changes and modifications as fall within the limit and scope of the appended claims.

What we claim as new and desire to secure by Letters Patent of the United States is—

1. A device of the character described, including a threaded bolt, a nut, the threaded portion of which bolt is provided with a longitudinal groove and is provided with a recess at the inner end of said groove, a leaf spring arranged in said groove and provided with a depending end to enter said recess in the bolt, a bearing member arranged in said groove and provided with a longitudinal wall, the outer end of said leaf spring being upturned in front of said bearing member to retain the same in effective position, a nut engaging and locking member including a shaft portion and a shank portion to be received in said bearing member and including a longitudinal knife edge angularly disposed with relation to said shank, said nut engaging and locking member being slightly rotatable within its bearing member, the shank of which is adapted to engage said longitudinal wall of said bearing member to limit the rotation of said nut engaging and locking member, to hold the same in effective operative position substantially as described.

2. A device of the character described, including a threaded bolt, a nut, the threaded portion of the bolt being provided with a longitudinal groove, a nut engaging and locking member in said groove, a bearing member therefor in said groove, a leaf spring in said groove disposed under said bearing member to impart resiliency thereto, said nut engaging and locking member including a longitudinal knife edge for immediate engagement with the threads of the nut, said nut engaging and locking member being slightly rotatable in said bearing member, said bearing member including means for limiting the rotation of said nut engaging and locking member to maintain the same in effective operative position.

In testimony whereof, we affix our signatures, in presence of two witnesses.

SANTOS PORTESI.
JOHN TAINI.

Witnesses:
F. W. HOPKINS,
JOHN J. FOSTER.

Copies of this patent may be obtained for five cents each, by addressing the "Commissioner of Patents, Washington, D. C."